United States Patent [19]
Ferrari et al.

[11] Patent Number: 5,586,364
[45] Date of Patent: Dec. 24, 1996

[54] FASTENING ELEMENT FOR HARDWARE PARTS AND HINGE EMBODYING SUCH ELEMENTS

[75] Inventors: Franco Ferrari, Frazione Deviscio 2, 22053 Lecco; Carlo Migli, Lecco, both of Italy

[73] Assignee: Franco Ferrari, Italy

[21] Appl. No.: 427,066

[22] Filed: Apr. 24, 1995

[30] Foreign Application Priority Data

May 13, 1994 [IT] Italy ................... MI940353 U

[51] Int. Cl.⁶ ........................................... E05D 5/00
[52] U.S. Cl. .................... 16/383; 411/57; 411/60; 411/46
[58] Field of Search ................. 16/382, 383; 411/45, 411/46, 60, 349

[56] References Cited

U.S. PATENT DOCUMENTS

| | | | |
|---|---|---|---|
| 2,571,641 | 10/1951 | Wing | 411/349 |
| 3,272,061 | 9/1966 | Seckerson | 411/349 |
| 4,647,262 | 3/1987 | Yokota | 411/349 |
| 5,346,349 | 9/1994 | Giovannetti | 411/349 |

FOREIGN PATENT DOCUMENTS

| | | | |
|---|---|---|---|
| 2502675 | 10/1982 | France | 16/383 |
| 2153426 | 5/1972 | Germany | 16/383 |
| 2231328 | 1/1974 | Germany | 16/383 |
| 2457172 | 6/1976 | Germany | 16/383 |

*Primary Examiner*—M. Rachuba
*Assistant Examiner*—Donald M. Gurley
*Attorney, Agent, or Firm*—Shlesinger, Fitzsimmons & Shlesinger

[57] ABSTRACT

A fastening element for fastening hardware elements (31) to parts of furniture units (14) comprises an expansion plug (11) having an axial through housing (17) which can receive an expanded pin (23), which can rotate between a position in which the plug is not expanded, to enable it to be inserted in a hole (16) in the furniture unit (14), and a position in which the plug is expanded to anchor it in the hole. The walls of the axial housing (17) and of the pin (23) have reciprocal contacting surfaces in the expanded position which diverge in the direction of insertion of the plug. A cam plate (32) provided centrally with a polygonal hole (33) for coupling with a protrusion (30) of the pin (23) and peripherally with a raised edge (34) for guiding fingers (22, 22') of the plug (11) for reversibly guiding the expansion of the plug.

15 Claims, 2 Drawing Sheets

5,586,364

FASTENING ELEMENT FOR HARDWARE PARTS AND HINGE EMBODYING SUCH ELEMENTS

BACKGROUND OF THE INVENTION

This invention refers to an element for rapidly fastening hardware elements, in particular hinges or runners for drawers, to parts of furniture units, by means of expansion plugs.

The invention also refers to a hinge embodying such fastening elements.

In the furniture making technology, wide use is made of expansion plugs for securing hinges to wooden panels. They are generally composed of an external element made of plastic material which expands elastically in a hole in the furniture unit, ensuring its adherence, after rotating (generally by 90°) an eccentric pin, or a pin extended cam-fashion, inserted therein.

By subsequently rotating the pin in the opposite direction, the plug can return to its original dimensions due to the elasticity of the material, enabling it to be removed from the hole whenever necessary.

This fastening system makes it possible, for example, to fit the door rapidly onto the piece of furniture directly on the end user's premises.

However, the simple rotation of the pin does not ensure adherence without end play. This could cause oscillation of the secured parts and, with the stress induced by use, progressively loosen the coupling.

Moreover, after remaining in the expanded position for a prolonged period of time, the plug may lose part of its elasticity and not return spontaneously to its original dimensions following counterrotation of the pin, and may consequently damage the hole in the furniture unit when removed.

The general scope of this invention is to obviate the aforementioned problems by providing an expansion plug-type fastening element which enables the parts to be quickly and easily assembled, ensuring a firm and long-lasting coupling between the pin and the plug.

A further scope of this invention is to guarantee the possibility of removing the plug from the hole in the furniture unit, whenever necessary, without damaging the latter.

A still further scope is to provide a furniture hinge embodying the fastening element according to the invention.

SUMMARY OF THE INVENTION

These scopes are achieved according to the invention by providing an element for fastening hardware elements to parts of furniture units, comprising a plug which is expansible by rotation therein of a pin, extended in a direction crosswise to the axis, inserted in its axial cavity and rotatable between a position in which the plug is not expanded to enable it to be fitted into a hole in the furniture unit and a position in which the plug is expanded to enable it to be anchored in the hole, characterized by the fact that the walls of the axial cavity and of the pin have reciprocal contacting surfaces in the expanded position which are divergent in the direction of insertion of the plug in the hole.

These scopes are further achieved by providing a furniture hinge having an assembling tray with holes in which the aforementioned fastening elements are pre-fitted.

BRIEF DESCRIPTION OF THE DRAWINGS

The innovative principles of this invention and its advantages with respect to the known technique will be more clearly evident from the following description of several possible exemplificative embodiments applying such principles, with reference to the accompanying drawings, in which.

DETAILED DESCRIPTION OF THE INVENTION

Figure 1:
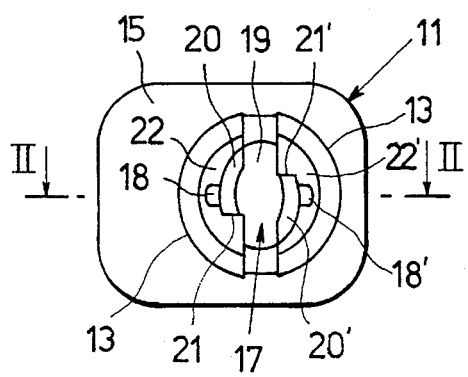
FIG. 1 shows a plan view of an expansion plug according to the invention, viewed from the side it is inserted into the furniture unit.
Figure 2:
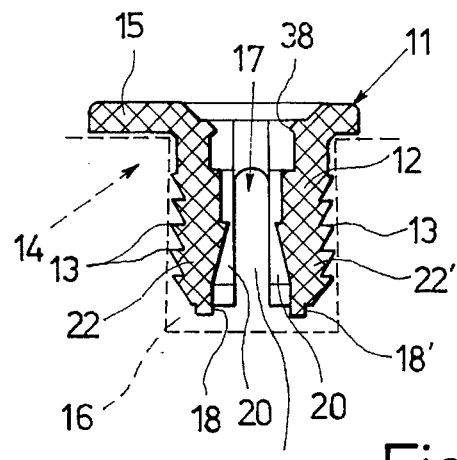
FIG. 2 shows a view along the line II—II of FIG. 1.

With reference to FIGS. 1 and 2, an expansion plug 11, advantageously made of plastic material, comprises an expansible casing 12, externally provided with gripping teeth 13. The casing 12 of the expansion plug 11 can be fitted into a hole 16 in a panel 14 to which it is to be secured. The internal diameter of the hole must be of such size as to ensure that the casing 12 of the expansion plug can fit substantially without interference into the hole 16.

Advantageously, in order to limit the penetration of the expansion plug into the hole, the expansion plug comprises a peripheral flange 15 which rests on the edge of the hole.

A housing 17 axially traverses the casing 12 of the expansion plug and extends into a cut in a diametral plane to divide the tooth area 13 into two portions or fingers 22, 22' that can be elastically forced apart from each other.

Figure 3:
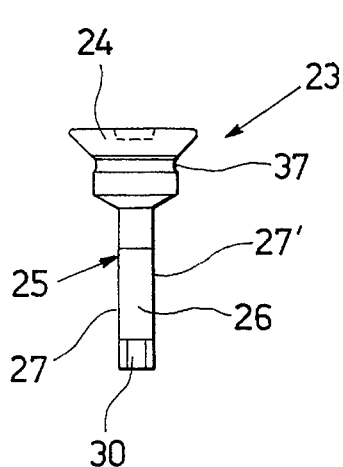
FIG. 3 shows a side view of a pin according to the invention.
Figure 4:
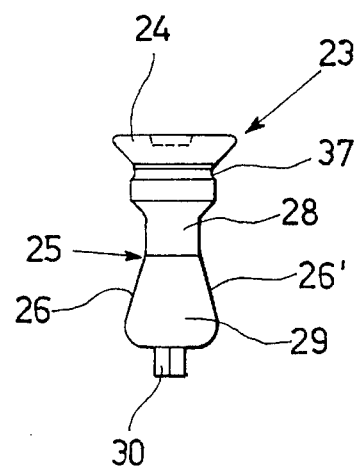
FIG. 4 shows a front view of a pin according to the invention.

A pin 23, shown in FIGS. 3 and 4, can be fitted into the through housing 17. The pin 23 is provided at one end with a head 24, which can be operated to rotate the pin inside the housing 17, and has a shank 25 widened in a direction crosswise to the axis to define, according to the invention, a portion 29 with lateral walls 26, 26' diverging towards its free end remote from its head 24, as shown in FIG. 4.

Figure 5:
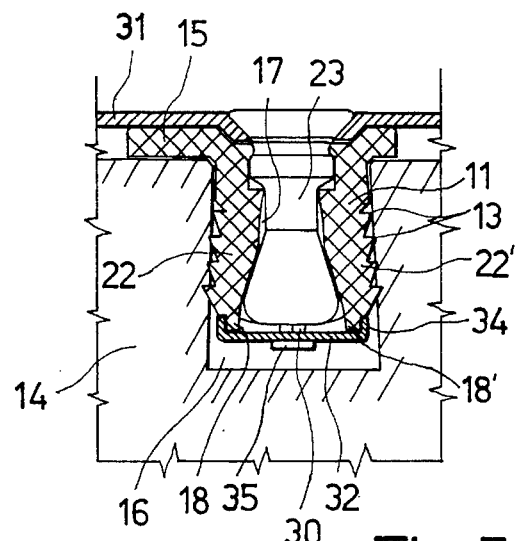
FIG. 5 shows a partial cutaway view of the fastening element according to the invention, fitted into the furniture unit and in the position of expansion of the expansion plug.

As can be seen in FIGS. 2 and 5, the housing 17 has corresponding slanting walls 20, 20' to constitute contacting surfaces with the walls 26, 26' of the pin when the latter is in the expanded position of the expansion plug.

For example, the housing 17, in correspondence with the dividing cut between the fingers 22, 22', is shaped according to curved surfaces 20, 20', for example in the form of truncated cones symmetrically misaligned with respect to the axis of the housing 17 to form an elongated cavity 19 with its major axis disposed perpendicular to the direction of expansion of the fingers 22, 22'; the cavity 19 is also provided, in correspondence with each surface 20, 20', with a respective striking surface 21, 21'.

Figure 7:
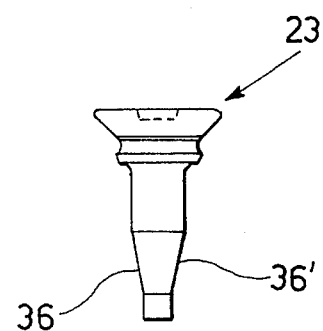
FIG. 7 shows a side view of a pin made according to a variation on the invention.

Advantageously, when the expansion plug is in the expanded position, the slant of the surfaces 20, 20' with respect to the axis of the housing 17 corresponds with the slant of the oblique portions 26, 26' of the lateral faces of the pin 23. The minor dimension of the elongated cavity 19 is substantially identical to the thickness of the pin. The pin can be obtained by casting or machining. For example, FIG. 3 shows a "cam" pin, in which the shank is flattened in a direction perpendicular to the direction of divergence of the walls 26, 26'. Conversely, FIG. 7 shows a side view of a pin with diverging walls made by flattening a cylindrical shank to obtain a frontal shape similar to the one shown in FIG. 4.

The procedure of fastening a hardware element 31, for example a hinge or a drawer runner, to the wooden panel 14, as can be seen in FIG. 5, is described hereunder.

The pin 23 is fitted into a hole in the hinge 31 and then into the housing 17 in the expansion plug 11, with the faces 27, 27' parallel to the major axis of the cavity 19.

To ensure a firm grip between the pin and the casing of the expansion plug, a circumferential groove 37 can advantageously be provided in the pin, to snap-fit onto a circumferential rib 38 around the upper wall of the housing 17.

The assembly thus obtained is subsequently fitted, without interference, into the hole 16 in the wooden panel 14, bringing the flange 15 into contact with the outer surface of the panel.

At this point, the pin 23 is rotated by a quarter turn until the surfaces 27, 27' come into contact with their respective striking surfaces 21, 21'.

During rotation, the oblique faces of the shank 25 act as a cam against the slanted surfaces of the cavity 19, expanding the fingers 22, 22' to grip the inside of the hole 16.

Due to the particular conformation according to the invention of the shank 25 and the cavity 19, with walls diverging in the direction of insertion of the expansion plug, during rotation the reaction generated on the interface between the plug and the lateral surfaces of the hole 16 has a direct component which tends to push the pin even further into the hole, thereby ensuring a firmer and more long-lasting grip of the assembly. This conformation also helps to continuously and accurately guide the expansion of the fingers 22, 22' upon rotation of the pin.

Advantageously, as can be seen in FIG. 5, the expansion plug comprises a plate 32 which function as a came to ensure that the fingers 22, 22' (which are pressed firmly outwards due to the slanted shape of the contact surfaces between the pin and the fingers) return to the position reached upon rotation of the pin, for disassembling.

Figure 6:
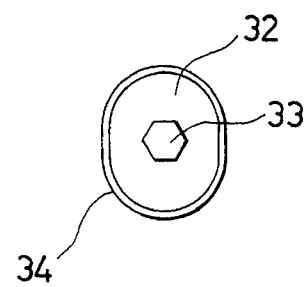
FIG. 6 shows a plan view of a cam for guiding the expansion of the expansion plug according to the invention.

As can be clearly seen in FIG. 6, the plate 32 is peripherally provided in the known way, for example by drawing, with a raised edge 34. The plate is integral with the pin to rotate therewith. For example, it can be advantageously provided with a central polygonal hole 33, which can couple with a complementary protrusion 30 on the pin 23.

The edge 34 constitutes an external guide for free ends or protrusions 18, 18' of the fingers 22, 22' upon rotation of the pin 23 in order to return the expansion plug 11 to the non-expanded position.

The plate 32 has a minor dimension which is substantially identical to the distance between the outer surface of said protrusions when the expansion plug is in the non-expanded position. The major dimension of the plate is not less than and preferably identical to the utmost distance required between the aforesaid protrusions when the expansion plug is expanded.

The plate can be assembled, before inserting the expansion plug 11 into the hole 16, by fitting the protrusion 30 on the pin into the polygonal hole 33 in the plate, as shown in FIG. 6, and securing the two elements in a known way, for example by riveting in 35 the protrusion 30 on the opposing face of the plate to block the pin axially. The sides of the fingers 22, 22' or the protrusions 18, 18' are fitted inside the edge 34 of the plate. In this way, the plate acts as a cam surface during rotation of the pin 23, following the expansion or guiding the contraction of the expansion plug and ensuring at all times the prompt contraction of the expansion plug.

Figure 8:
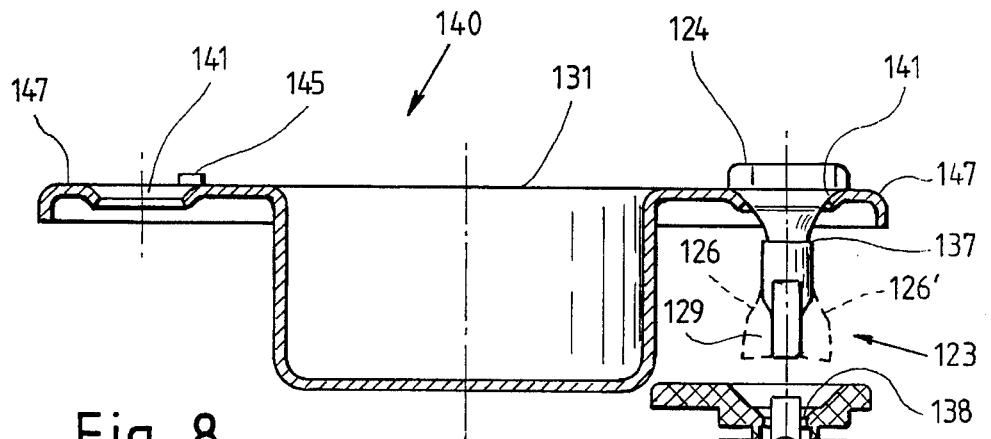
FIG. 8 shows a cross-sectional view along the line VIII—VIII of FIG. 9, of a second embodiment of a coupling system according to the invention.

FIG. 8 shows a furniture hinge 140 embodying a coupling system according to the invention. For the sake of convenience, parts similar to those described above for the embodiment shown in FIGS. 1–7 will be indicated hereinafter with the same numbering increased by one hundred.

For the sake of simplicity, only one expansion plug-pin assembly is shown. It is understood that the assemblies will be one for each fastening hole 141 made in lateral wings 147 of a tray 131 of the hinge. The hinge will not be described or shown in detail herein since it is substantially of known technique and therefore easily imaginable by the expert in the art.

In the embodiment of FIG. 8 each fastening assembly comprises an expansion plug 111 in turn comprising an expansible casing 112 externally provided with gripping teeth 113 to enable it to fit and grip in an assembling hole in a furniture unit (now shown). The expansible casing has cuts in axial planes to define expansion fingers 122, 122'. Disposed between the fingers is an axial housing 117 into which a control pin 123 can be inserted. The housing has slanted walls 120, 120', which are complementary to slanted walls 126, 126' of a flattened portion 129 of the pin 123, as described for the embodiment of FIGS. 1–7.

The pin 123 has a circumferential step 137 facing towards the head 124 of the pin to define a ledge for coupling with a projection 138 protruding towards the inside of the housing in the expansion plug. Thus, once the pins 123 have been inserted into the fastening holes 141 in the tray, each pin (positioned as shown by the continuous line in FIG. 8) can be inserted in its respective expansion plug 111. When fully inserted, the projection 138 will snap-fit over the step 137 and keep the expansion plug secured to the pin, while at the same time leaving the pin free to rotate within a cavity 119 in the housing 117.

The hinge can thus be prepared with expansion plugs and pins factory-mounted. The installer is thus able to rapidly fit the hinge onto a furniture unit by simply inserting the pre-assembled expansion plugs into the holes and rotating the pins to shift them to the locked position, shown by the broken line in FIG. 8, in which the expansion plug is expanded as described for the embodiment of FIGS. 1–7.

Figure 9:
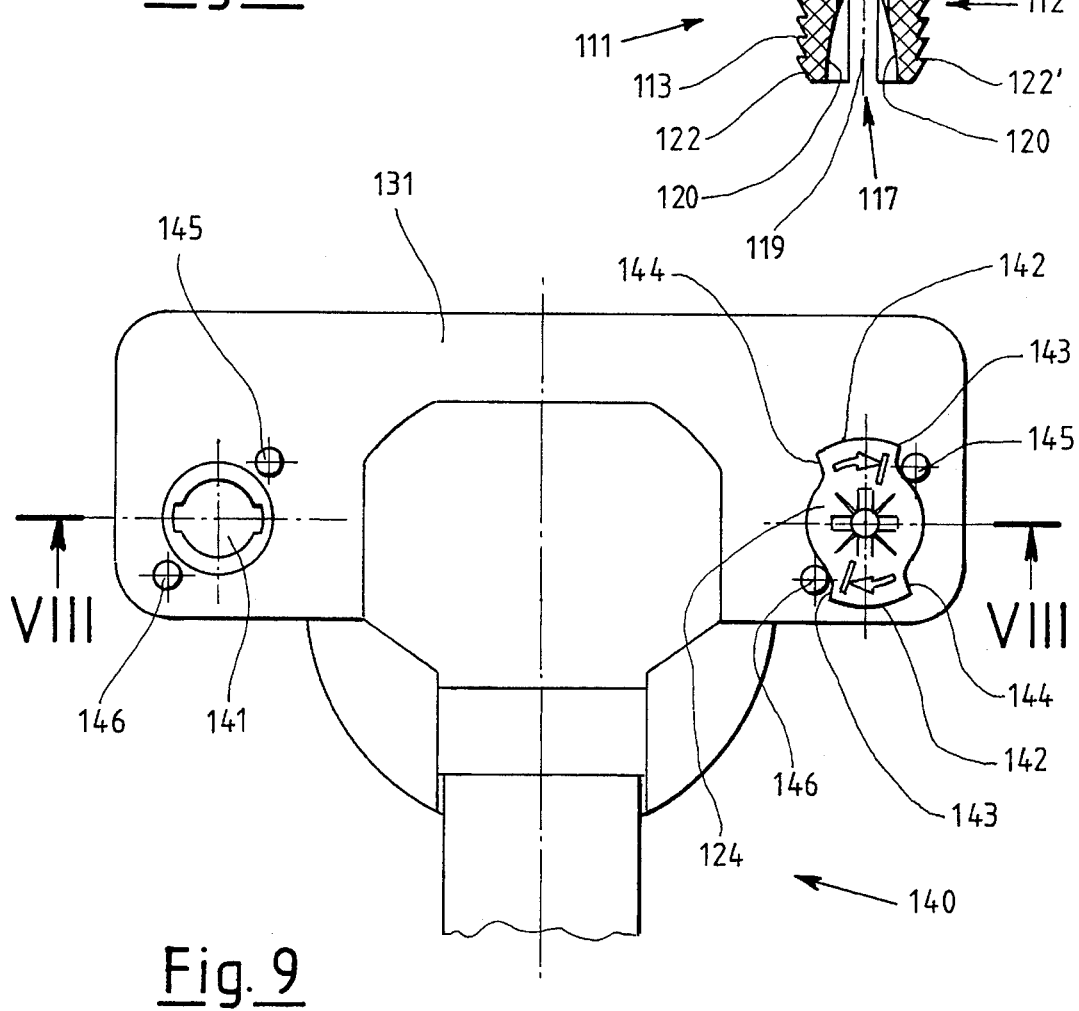
FIG. 9 shows a plan view of the system of FIG 8.

As can be seen in FIG. 9, the extreme positions during rotation of the pins 123, corresponding to the fully expanded and non-expanded positions of the expansion plug, are defined by radial protrusions 142 on the head 124 of the pin, which define opposing lateral edges 143, 144 which alternately abut against stop pins or protrusions 145, 146 protruding from the surface of the tray on two sides of the holes 141.

Advantageously, arrows and references for operating the pin can be engraved on the head of the pin. At this point it will be clear that the intended scopes have been achieved by providing easily preassembled quick fitting systems, in particular for furniture hinges. The foregoing description of embodiments applying the innovative principles of this invention is obviously given by way of example in order to illustrate such innovative principles and should not therefore be understood as a limitation to the sphere of the invention claimed herein.

For example, the pin 23, 123 can be made by various procedures, provided it maintains a frontal profile similar to the one shown in FIG. 4, as will be obvious to the expert in the art.

Obviously, the heads of the pins can be provided with any known operating means. For example, heads with cross or straight slots, socket heads, polygonal heads and the like can be used.

Moreover, the coupling between the plate 32 and the pin 23 can be made in any known way without necessarily including the protrusion 30 and the hole 33.

The camming plate 32 can also be applied in the expansion plug 111, just as the striking surfaces 21, 21' can also be used in it.

What is claimed is:

1. A fastening element for fastening hardware elements to parts of furniture units, comprising a plug which has therethrough an opening defining an axial housing between opposed side walls of the plug which are expansible, said housing having therein a pin, said pin having opposed side portions thereof extended in a direction crosswise to the axis of said housing and being rotatable between a first position in which the side walls of the plug are not expanded to enable one end thereof to be inserted into a hole in the furniture unit, and a second position in which the plug side walls are expanded by said extended side portions of said pin to enable said plug to be anchored in the hole, and characterized by the fact that the confronting surfaces of the axial housing and of the extended side portions of the pin have reciprocal contacting surfaces in the expanded position which are divergent in the direction of said one end of the plug.

2. A fastening element as claimed in claim 1, characterized by the fact that the reciprocal contacting surfaces of the axial housing and of the pin are inclined in the same direction with respect to the axis of the housing.

3. A fastening element as claimed in claim 1, characterized by the fact that the reciprocal contacting surfaces of the axial housing are portions of lateral surfaces of two truncated cones misaligned with respect to the axis of the housing, the portions being separated from each other by a cut in a diametral plane to the expansion plug in order to form a cavity elongated in a direction perpendicular to the direction of expansion of the plug, while the reciprocal contacting surfaces of the pin are lateral connecting surfaces between two trapezoidal faces.

4. A fastening element as claimed in claim 1, characterized by the fact that said one end of the expansion plug fits into said hole with said side walls thereof radially spaced apart from each other upon rotation of the pin towards its expanded position.

5. A fastening element as claimed in claim 4, characterized by the fact of comprising a cam plate extended radially to the expansion plug and coupled to the pin to rotate therewith, the plate peripherally comprising an edge radially acting upon free fingers of the expansion plug to shift them towards each other upon rotation of the pin towards its non-expanded position.

6. A fastening element as claimed in claim 5, characterized by the fact that the pin has the free end of its shank with a polygonal cross-section to fit into a complementary hole in the plate.

7. A fastening element as claimed in claim 5, characterized by the fact that the cam plate is shaped in the form of an oval tray with its minor dimension substantially identical to the distance between the fingers of the expansion plug in the non-expanded position and with its major dimension not less than and preferably identical to the distance between the aforesaid fingers when the expansion plug is expanded.

8. A fasting element as claimed in claim 1, characterized by the fact that disposed between the pin and expansion plug are reciprocal snap-fit coupling means which prevent the pin from being removed from the housing after its insertion therein.

9. A fastening element as claimed in claim 8, characterized by the fact that the coupling means comprise a peripheral projection disposed on an internal wall of the housing which fits into a corresponding groove made in the external surface of the pin.

10. A fastening element as claimed in claim 9, characterized by the fact that the peripheral projection is close to an entrance of the pin into the housing.

11. A fastening element as claimed in claim 1, including retaining elements constituting limit stops to limit rotation of the pin between said first and second positions.

12. A fastening element as claimed in claim 11, characterized by the fact that the retaining elements comprise stop surfaces disposed in the housing to constitute a bearing for corresponding surfaces on the pin.

13. A fastening element as claimed in claim 11, characterized by the fact that the retaining elements comprise radial protrusions on a head of the pin which strike against corresponding stop protrusions which protrude from a surface on which the head of the pin rotates.

14. Furniture hinge comprising a tray for securing the hinge, the tray having fastening holes which are pre-fitted with fastening elements made according to any one of the previous claims.

15. Hinge as claimed in claim 14, characterized by the fact that in order to identify the positions of the pin corresponding to the expansion and non-expansion of the expansion plug of the fastening elements, the tray is provided adjacent opposite sides of the fastening holes with stop pins for engagement by corresponding radial protrusions formed on the head of the pin.

* * * * *